Nov. 20, 1945.  J. R. C. QUILTER  2,389,578
PARACHUTE PACK
Filed June 13, 1944  4 Sheets-Sheet 1
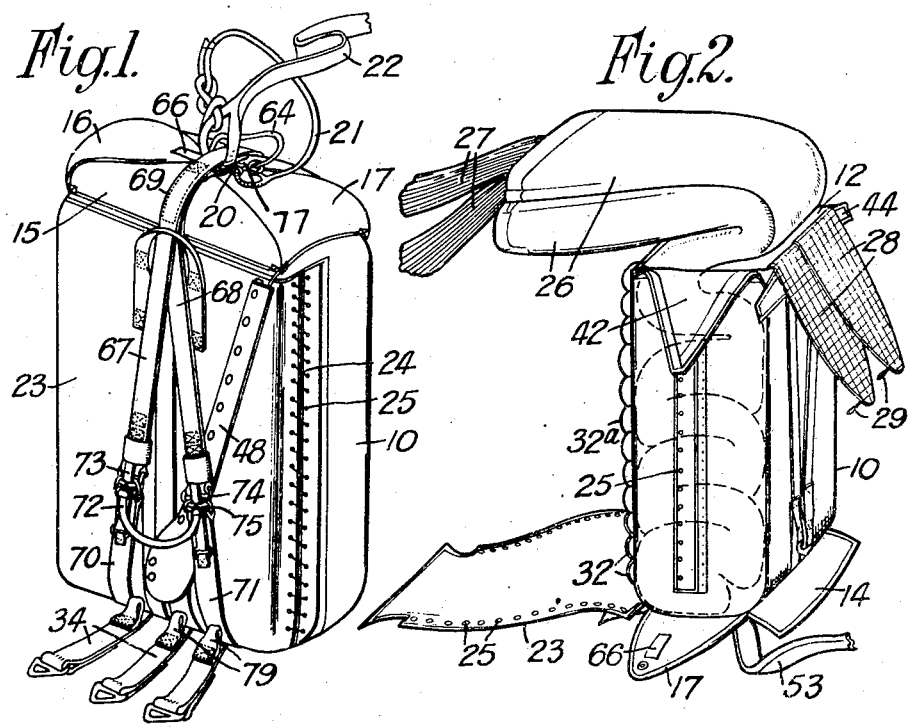
Inventor
JOHN RAYMOND CUTHBERT QUILTER
ATTORNEY

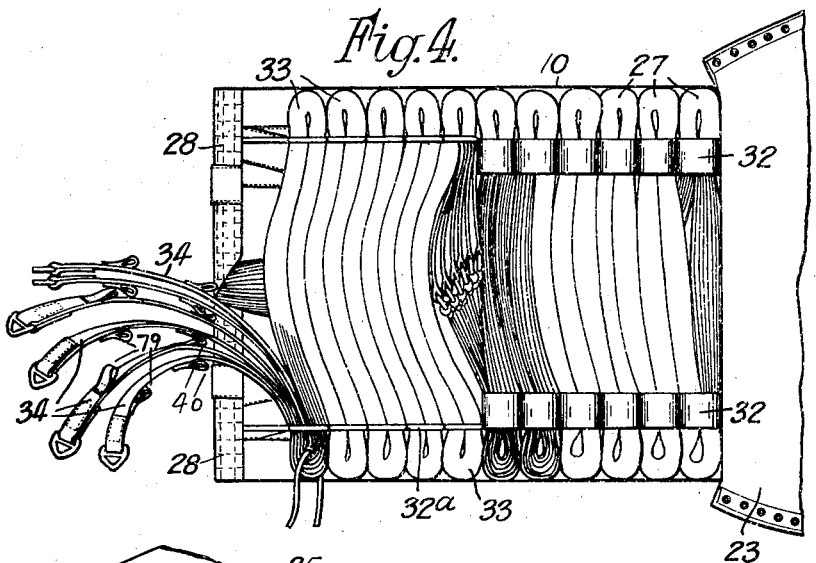
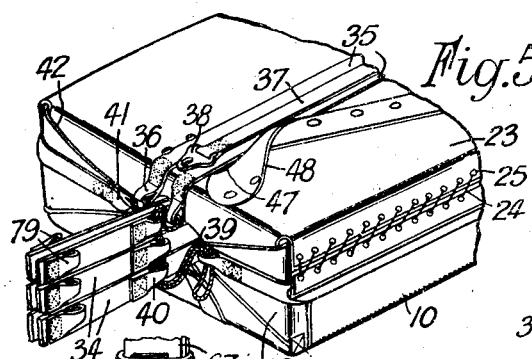
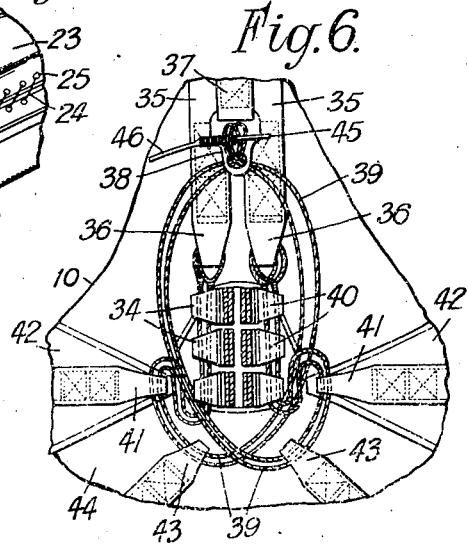
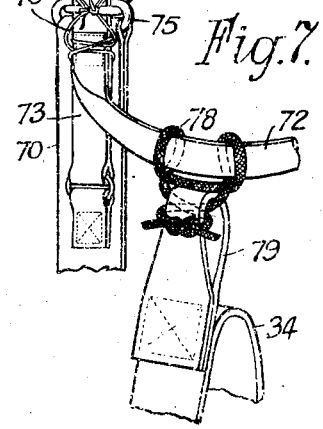

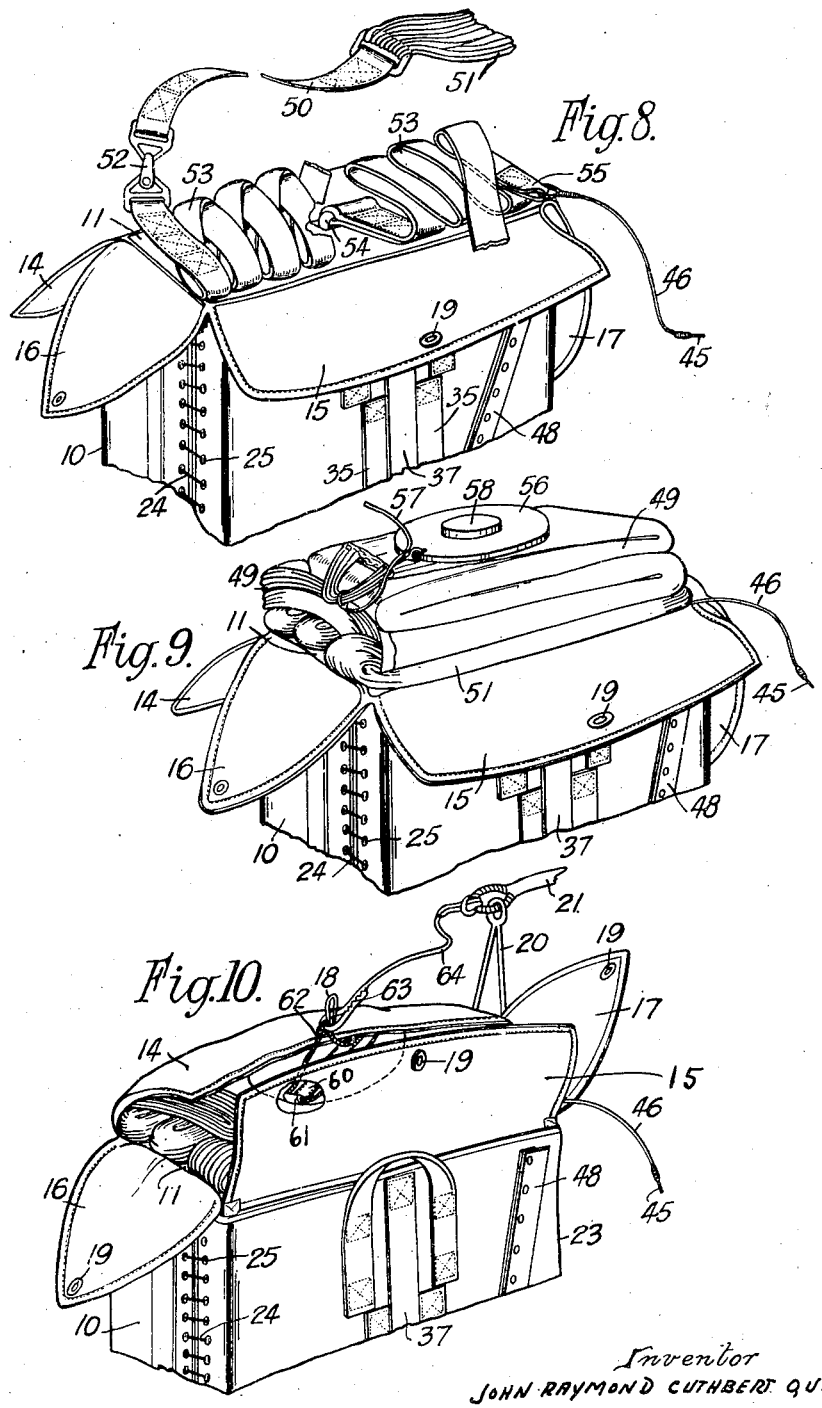

Nov. 20, 1945. J. R. C. QUILTER 2,389,578
PARACHUTE PACK
Filed June 13, 1944 4 Sheets-Sheet 4

Inventor
JOHN RAYMOND CUTHBERT QUILTER

Cowling
ATTORNEY

Patented Nov. 20, 1945

2,389,578

UNITED STATES PATENT OFFICE 2,389,578

PARACHUTE PACK

John Raymond Cuthbert Quilter,
Woking, England

Application June 13, 1944, Serial No. 540,031
In Great Britain June 8, 1943

6 Claims. (Cl. 244—148)

This invention relates to parachute packs for loads to be dropped from aircraft and is particularly applicable to the dropping of heavy loads; these heavy loads require parachutes of larger size than the standard employed for personnel, or alternatively a plurality of parachutes.

In the customary method of releasing parachutes by means of a static strop or line attached to the aircraft, the empty parachute pack or container remains connected to the aircraft by the static strop and may therefore cause damage or interference in the continued flight of the aircraft; this disadvantage becomes increasingly serious with larger parachute containers. Moreover, when the parachutes are deployed by extracting them apex-first from the container, they are subjected to excessive shock at opening and progressive failure may occur; it is therefore advisable not to use this method.

The present invention has for its primary object to provide an improved parachute pack in which a retarder parachute comes into action when clear of the aircraft and restrains the further descent of the pack which is then opened for the extraction of the main parachute.

Another object of the invention is to provide a parachute pack from which the parachute is extracted by the pull of the load upon the rigging lines, under the control of a retarder parachute which supports the pack independently of the aircraft.

A further object of the invention is to provide a parachute pack which forms a temporary connection between the static strop or line attached to the aircraft and the load-carrying parachute enclosed in the pack, the latter being disconnected automatically from the static strop when tension arises between them, after which disconnection the pack is supported by a retarder parachute while the rigging lines of the main parachute are extracted first and the deployment of the main canopy then takes place.

Still further objects of the invention comprise the provision of means for withdrawing the retarder parachute from its container under the control of a rip-cord device operated by a static strop or line attached to the aircraft, means for locking the main parachute in its container until released automatically when the pack is dropped from the aircraft, a pack-carrying cradle normally fastened to prevent extraction of the parachutes from the pack until released by the load tension, and improved means for locking the closure flaps of the main parachute container.

Other objects and advantages of the invention will hereinafter appear from the following description of a preferred embodiment, given with reference to the accompanying drawings, in which:

Fig. 1 represents a pack enclosing main, intermediate or retarder and pilot parachutes, the main lift webs being shown loose at the bottom of the pack.

Fig. 2 shows the empty pack inverted, with the main parachutes being stowed therein.

Fig. 3 shows the pack with the rigging lines of the main parachutes being stowed under their retaining loops.

Fig. 4 shows the pack with the main rigging lines and load suspension strops stowed under the loops.

Fig. 5 shows the bottom end of the pack in closed condition.

Figs. 6 and 7 are details showing respectively the locking of the main lift webs to the bottom of the pack and the tying of each lift web to a release handle of the carrying cradle.

Fig. 8 shows the upper end of the pack, with the retarder strops being stowed therein.

Fig. 9 shows the retarder parachute stowed.

Fig. 10 shows the pilot parachute stowed and the first closure flap laid over it.

Figure 11:
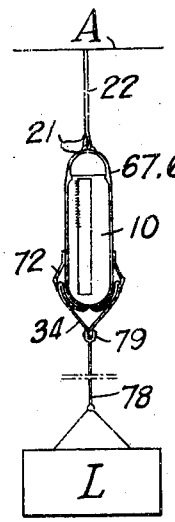
Figs. 11 to 15 show successive stages in the release of the parachutes for dropping a load from an aircraft, Fig. 15 being on a reduced scale.

When employing a single pack, as illustrated in the drawings, the pack or container 10 includes an upper compartment 11, within which the pilot and retarder parachutes are stowed, and a lower compartment 12, within which the main parachutes are stowed; the lower compartment, which may include apex ties 13 for the main parachute canopies, is of much greater depth than the upper one, which is afforded to a large extent by the bulging of its overlapping closure flaps 14, 15, 16 and 17. These flaps are held together by a wire loop 18 attached to the undermost flap 14 and passing through eyelets 19 in the overlapping portions 15, 16 and 17, with a retaining pin 20 engaged through the loop; the pin 20 controlling the closure of this upper compartment is connected loosely by a line 21 to the free end of the static strop 22 attached at its other end to the aircraft.

The container is also provided with a front cover flap 23, the edges of which are normally attached to the body of the container by lacing cord 24 through eyelets 25; beneath this cover the main shroud lines and their extensions or lift webs are stowed under retaining loops of the well known kind.

In packing the parachutes, the main parachutes, for example three in number, are first stowed in the lower compartment 12 of the container; the canopies 26 are cleared and folded in the conventional manner, but two of them are folded to half the width of the container 10 and laid side by side, while the third canopy is folded to the full width of the container and laid upon the other two, the three canopies being then pleated into the container, as indicated in Fig. 2, with their apices tied inside the compartment 12 and their rigging or shroud lines 27 emerging from the mouth. These rigging lines are brought up over the body of the container and conveniently grouped beneath two flaps 28 attached to the back of the container, these flaps being turned in over the folded canopies, as indicated in Fig. 3, so as to retain them in place; the extremities of the retaining flaps are provided with locking studs or loops 29 which are passed outwardly through eyelets 30 in the front wall of the container and locked by two release wires 31 anchored centrally between the eyelets. The rigging lines 27 are formed into two groups 27a and 27b passing under the respective release wires 31, so that their pull will release the canopy retaining flaps, and the two groups are then combined into a single group 27c for stowage zigzag fashion in the retaining loops 32 along opposite sides of the container wall; after the rigging lines 27 have been stowed, the connected strops or webbing extensions 33 will be similarly stowed in elastic retaining loops 32a as far as the mouth or bottom end of the container, as indicated in Fig. 4, leaving their extremities or lift webs 34 free, for example six in number. These lift-webs projecting from the bottom of the container are divided into groups of three, each group being subsequently attached to a shackle, and the two shackles being attached to an eye or grommet at the end of a wire cable having bridles connected to the load.

The front cover flap 23 attached to the other end of the container will next be laid over the stowed rigging lines and strops, as indicated in Fig. 5, the side edges of this flap being laced to the eyeletted edges of the container body by means of cord 24; the outer face of this cover flap is provided with three longitudinal and closely disposed reinforcing straps, the two outer and longer ones 35 terminating in beckets 36 and the central one 37 terminating in an apertured lug or eye 38. To each of the two beckets 36 there is secured a short length of wire cable 39 with looped ends; these cables are passed through other beckets or loops 40 upon the lift webs 34, one cable to each group of three webs, through a pair of beckets 41 on lateral cover flaps 42, which are thus drawn tightly over the canopy retaining flaps 28, and through a pair of beckets 43 stitched to the back flap 44 of the container; the free ends of the cables 39 are then brought round to complete the encirclement of the lift webs 34 and their loops passed upwardly through the apertured lug or eye 38 of the central reinforcing strap 37, as indicated in Fig. 6. The projecting portions of the cable loops are locked by a rip-cord pin 45 at the end of a release wire 46 which is operated automatically to withdraw the pin 45 when the load is dropped from the aircraft. The withdrawal may be effected by connecting the release wire to the load, the connection being slightly shorter than the main load-carrying cable, bridles or the like, so that the locking pin will be withdrawn after the load and pack have separated by a predetermined distance. In the arrangement hereinafter described, however, the rip-cord release wire 46 is enclosed in a diagonal channel or pocket 47 extending from near the apertured lug 38 to a top corner of the container, the channel being normally covered by a press-studded flap 48 (see Fig. 1); the release wire 46 will be attached at its other end to the attachment or extension strop of the retarder parachute which is to be stowed in the upper compartment 11, such retarder parachute being of calculated size to give the required retarding force necessary to ensure the subsequent withdrawal of the main parachutes.

This retarder parachute has its canopy 49 likewise folded in the conventional manner and then folded again by bringing the right hand half bodily over on top of the left hand half so that the rigging lines extend from one side edge of the bundle; the retarder extension strop 50 from the rigging lines 51 is connected by a shackle 52 to an attachment strop 53 which is secured to the container 10 by a shackle 54 inside the upper compartment 11, as indicated in Fig. 8, which shows the attachment strop 53 fitted with a becket 55 for the connection of the release wire 46. These two strops are then stowed in the compartment 11 by folding them in zigzag loops (the narrow way of the container) starting from the shackle 54, proceeding towards one side of the container and then returning back to the other side until both strops have been stowed; the rigging lines 51 are then stowed over the strops by folding them in zigzag loops (the wide way of the container) until the canopy 49 is pulled up to the pack. This canopy is then laid on top of the rigging lines and folded over upon itself, in the same direction (viz. the wide way of the container), as indicated in Fig. 9, an ejector board 56 such as described in the prior Patent Specification No. 2,299,407 being placed centrally on top of the folded retarder canopy, and the pilot parachute connecting cord 57 being coiled around the raised boss 58 of the board; the pilot parachute 59, preferably of the type described in the prior Patent Specification No. 2,299,408, is then placed upon the ejector board, with the bottom of its coiled spring surrounding the boss 58, and pressed down flat, the vanes and gores being tucked under the spring top in the crown of the canopy. The latter is provided with a tape strip 60, running diametrically across the crown, the ends of this tape being formed into loops 61; through these two loops there is passed a cord 62 which is tied to the looped end 63 of a lazy cord 64 connected to the static line 21, the looped end of the cord 64 being passed over the wire loop 18 of the flap 14, as indicated in Fig. 10. The three other flaps 15, 16 and 17 are then engaged with the loop 18, the triangular side flaps 16 and 17 being engaged last, and the closure is locked by inserting through the projecting portion of the wire loop 18 a forked retaining pin 20 attached to the static line 21; the ends of this pin 20 are inserted in a pocket 66 upon one of the side flaps 16, 17. The release wire 46 shown projecting from the right hand corner of the container in Figs. 8, 9 and 10, and connected to the becket 55 upon the retarder attachment strop, will be housed in the diagonal pocket 47 on the front cover flap 23; in order to facilitate the packing of the container, this release wire may be left free until the upper flaps 14, 15, 16 and 17 have been closed over the intermediate or retarder and pilot parachutes, the looped cables 39 at the lower end of the container being temporarily locked to the apertured lug or eye 38 by means of a suitable pin or tie which can be replaced by the rip-cord pin 45 after the packing is completed, and the release wire 46 being then enclosed in its pocket 47 and the cover flap 48 secured by its press-studs.

The container, with parachutes stowed therein, may be provided with a carrying cradle attached to the static strop and normally locked in its closed position by suitable fastenings at front and rear of the pack, these fastenings being controlled by the respective groups of lift webs; as indicated in Fig. 1, the cradle comprises four lengths of webbing or the like, two upper ones 67 and 68 stitched together at 69, and two lower ones 70 and 71 connected together at both ends by release handles 72. Each of these handles is stitched at its ends to two toggle members or tongues 73 normally engaging cranked hasps 74 at the ends of the webs 67 and 68, after these hasps have been fitted through fastening rings 75 at the ends of the lower webs 70, 71; as indicated in Fig. 7, the tongue and hasp are tied together by a cord 76 of suitable breaking strength to prevent accidental disengagement. The upper webs 67 and 68, which are crossed over one another at the top of the container, are passed through the looped end of the static strop 22, to which they may be secured by a loop 77 stitched beneath them. The lower webs 70 and 71, connected by the release handles 72, are attached to the lift webs 34 extending from the bottom of the container; each handle is tied by a cord 78 to a becket 79 upon each of the three lift webs 34 in one group, at front or at rear of the container. In this way, the free extremities of the lift webs 34 are lifted towards the handles 72; when the load is dropped from the aircraft, and as soon as the static strop 22 is drawn taut, the lift webs 34 will pull down the handles 72 so as to release the fastenings 74 and 75, after breaking the cord ties 76, the disconnected parts of the cradle remaining attached to the static strop and to the lift webs respectively.

Figure 12:
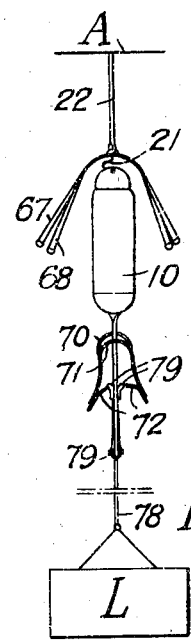
Figure 13:
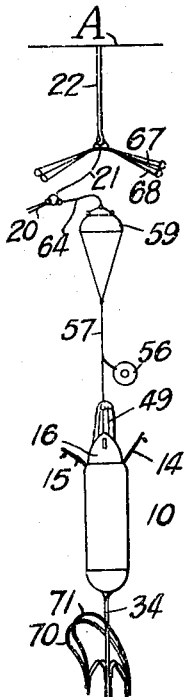
Figure 14:
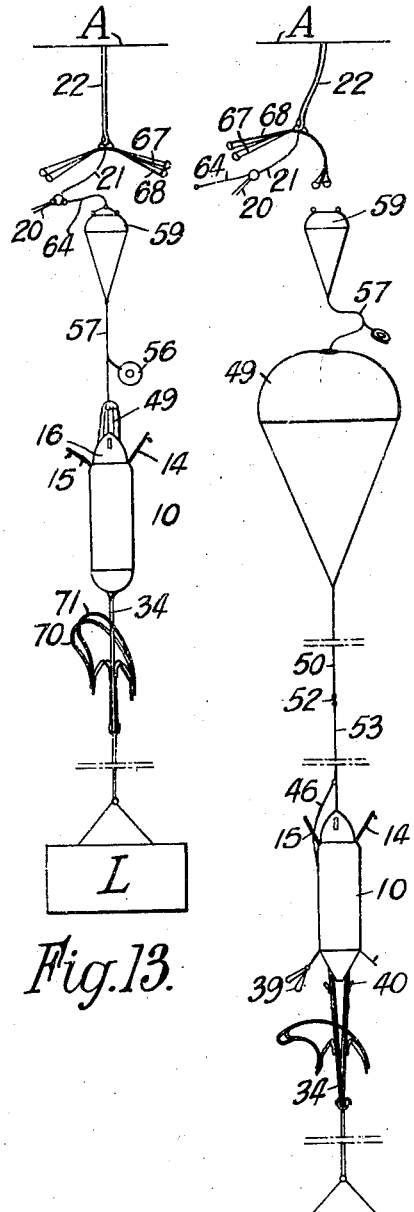
Figure 15:
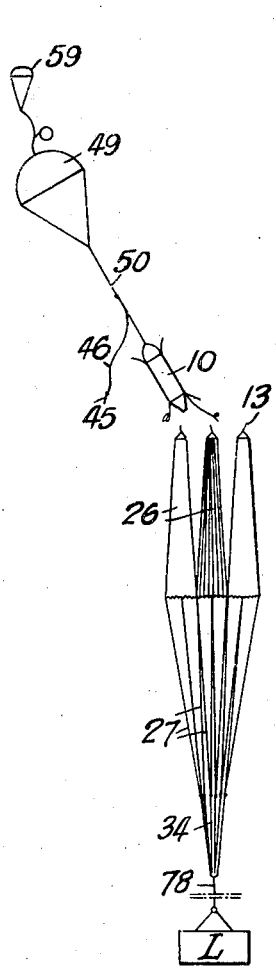

The sequence of operations in the dropping of a load is shown diagrammatically in Figs. 11 to 15; in Fig. 11, the load L is seen falling away from the aircraft A, the pack or container 10 being lifted clear of the load by the short static strop 22, while the wire cable 78 connected to the load pulls down the shackles 79 to which the two groups of lift webs 34 are attached. In Fig. 12, the tension upon the lift webs has caused the release handles 72 to break the ties upon their toggles and to release the cradle fastenings 74, 75, the lift webs 34 pulling out as far as allowed by their beckets 40 which are still locked to the container by the cables 39; in the meantime, the static line 21 comes under tension as the cradle is unfastened, with the result that the retaining pin 20 will be withdrawn from the pocket 66 and pulled out of the wire loop 18. This allows the top closure flaps 14, 15, 16 and 17 to open, as shown in Fig. 13; with the load L continuing to fall, the pilot parachute 59 has sprung out of the container, assisted by the pull of the lazy cord 64; in its turn, the pilot parachute withdraws the intermediate or retarder parachute 49 apex first from the container, by means of the connecting cord 57. In Fig. 14, the retarder parachute 49 is shown fully open and the pilot parachute 59 has been detached from the lazy cord 64 by the breakage of the cord tie 62, the only parts left attached to the aircraft being the static strop 22, the line 21 with lazy cord 64 and retaining pin 20, and the upper webs 67 and 68 of the cradle; the tension upon the retarder extension and attachment strops 50 and 53 has operated the release wire 46 to withdraw the rip-cord pin for the cables 39; the closure flaps 42 and 44 and the end of the front cover flap 23 at the bottom of the container have therefore opened for the main lift webs 34 and rigging lines 27 to pay out in regular manner, each loop in succession becoming free as it is pulled out from the two lines of retaining loops; as the last length of the grouped rigging lines leaves the container, the release wires 31 are drawn from the locking loops 29 of the retaining flaps 28, which thus become free to open for the withdrawal of the main parachute canopies. Fig. 15 shows the three main parachutes 26 completely withdrawn clear of the container, their apex ties 13 being broken but the canopies not yet fully open; the container 10 is supported independently by the retarder parachute 49 so as not to interfere with the descent of the load. The deployment and separation of the main canopies will draw the lift webs apart, one web of each group being connected to each canopy, so that the cord ties 78 will be broken to allow the pairs of lift webs complete independence during the descent of the load; as soon as the load has landed, it can be disconnected from the rigging lines 27 of the three main parachutes by automatic release devices of any suitable type, so that these parachutes can sail away clear of the load.

The deployment of the main parachutes from the bottom of the container, by extracting the rigging lines first, reduces the shock load and strain upon the canopies, as compared with deployment from the apex first, while the retarder parachute on the pack or container gives an effect equivalent to that of a static strop attached to the container, without the disadvantages of that arrangement. It will often be preferable to employ separate packs or containers for the retarder and main parachutes and to dispense with the aforesaid lifting cradles, the retarder parachute being then allowed to lift the main pack clear of the load.

The main parachutes may be enclosed in one or more packs, each enclosing a retarder parachute or with one retarder controlling the release of two or more main parachutes, according to circumstances; the pilot and retarder parachutes may also be placed in a separate pack or container, positioned on any desirable part of the load, such as the rear end, while the main container or containers is or are advantageously positioned in a stowage that suits the center of gravity of the whole load, as carried in the aircraft. The release wire 46 for withdrawing the rip-cord pin of the locking cables 39 will then be extended from the pilot and retarder parachute container to the main pack or packs and may be utilized for supporting the latter from the retarder parachute after the main parachutes have been released.

This positioning of the pilot and retarder parachutes separately from the main parachute or parachutes, for example at the upper end of the same container as in the embodiment described, or on the rear end of the load when they are placed separately, is preferable in most parachute operations, as the pilot and retarder parachutes can then deploy unhindered in the air stream when the load is falling, and not become blanketed by dead air or catch on any projecting part of the falling load.

In applying the invention to parachute packs for personnel, where one main parachute will normally be sufficient, this main parachute may likewise be stowed in a container separate from that containing the intermediate or retarder parachute and the pilot parachute (if any).

What I claim is:

1. A parachute pack comprising a plurality of parachutes, a container having two compartments, one of said compartments being adapted to contain a main parachute and the other of said compartments being adapted to contain a retarder parachute, means for closing each of said compartments, a flexible member adapted to be tensioned by the fall of said pack from an aircraft, said flexible member acting under tension to release the closing means of said other compartment for escape of said retarder parachute, flexible means extending from said main parachute for attachment of the load, and means operated by the load tension on said flexible means for releasing the closing means of said one compartment, said main parachute being extracted from said one compartment by the load tension while said container is supported by said retarder parachute.

2. In a parachute pack, the combination of a main parachute, a container for said main parachute, a carrying cradle for said container, a static strop for attaching said cradle to an aircraft, a retarder parachute, means for enclosing said parachutes in said container, flexible means extending from said main parachute for attachment of the load, means operated by the load tension on said flexible means for unfastening said cradle to free said container, means subsequently operated by the load tension on said flexible means for releasing the enclosing means of said retarder parachute, said retarder parachute then supporting said pack independently of the aircraft and static strop, and means subsequently operated by the load tension on said retarder parachute for releasing the enclosing means of said main parachute, said main parachute being then withdrawn from said container by the load tension acting through said flexible means while said container remains supported by said retarder parachute.

3. A parachute pack comprising a plurality of parachutes, a container having two compartments, one of said compartments being adapted to contain a main parachute and the other of said compartments being adapted to contain a retarder parachute, means for closing each of said compartments, a flexible member adapted to be tensioned by the fall of said pack from an aircraft, said flexible member acting under tension to release the closing means of said other compartment for escape of said retarder parachute, lift webs extending from said main parachute for attachment of the load, and means operated by the load tension on said lift webs for releasing the closing means of said one compartment, said main parachute being extracted from said one compartment by the load tension while said container is supported by said retarder parachute.

4. In a parachute pack, the combination of a main parachute, a container for said main parachute, a carrying cradle for said container, a static strop for attaching said cradle to an aircraft, a retarder parachute, means for enclosing said parachutes in said container, lift webs extending from said main parachute for attachment of the load, means operated by the load tension on said lift webs at full extension of said static strop for unfastening said cradle to free said container, means subsequently operated by the load tension on said lift webs for releasing the enclosing means of said retarder parachute, said retarder parachute then supporting said pack independently of the aircraft and static strop, and means subsequently operated by the load tension on said retarder parachute for releasing the enclosing means of said main parachute, said main parachute being then withdrawn from said container by the load tension acting through said lift webs while said container remains supported by said retarder parachute.

5. In a parachute pack, the combination of a main parachute, a container for said main parachute, a carrying cradle for said container, said cradle comprising flexible members surrounding said container and detachable fastenings for the extremities of said flexible members, a static strop for attaching said flexible members to an aircraft, a retarder parachute, means for enclosing said parachutes in said container, flexible means extending from said main parachute for attachment of the load, means operated by the load tension on said flexible means at full extension of said static strop for detaching the fastenings of said cradle to free said container, means subsequently operated by the load tension on said flexible means for releasing the enclosing means of said retarder parachute, said retarder parachute then supporting said pack independently of the aircraft and static strop, and means subsequently operated by the load tension on said retarder parachute for releasing the enclosing means of said main parachute, said main parachute being then withdrawn from said container by the load tension acting through said flexible means while said container remains supported by said retarder parachute.

6. In a parachute pack of the character described, comprising a container enclosing main and auxiliary parachutes, means for releasing an auxiliary parachute from said container when said pack is dropped from an aircraft, and means for releasing a main parachute when said container is supported by said auxiliary parachute, a carrying cradle for said container, said cradle comprising flexible members surrounding said container, fastenings normally engaged with said flexible members, and means for disengaging said fastenings prior to release of said auxiliary parachute, said flexible members being attached to the static line of the aircraft, and said fastenings being attached to load-supporting connections of the main parachute.

JOHN RAYMOND CUTHBERT QUILTER.